(No Model.) 2 Sheets—Sheet 1.
J. & W. TITUS.
CART FOR TRANSPORTING TELEGRAPH POLES, &c.
No. 504,377. Patented Sept. 5, 1893.
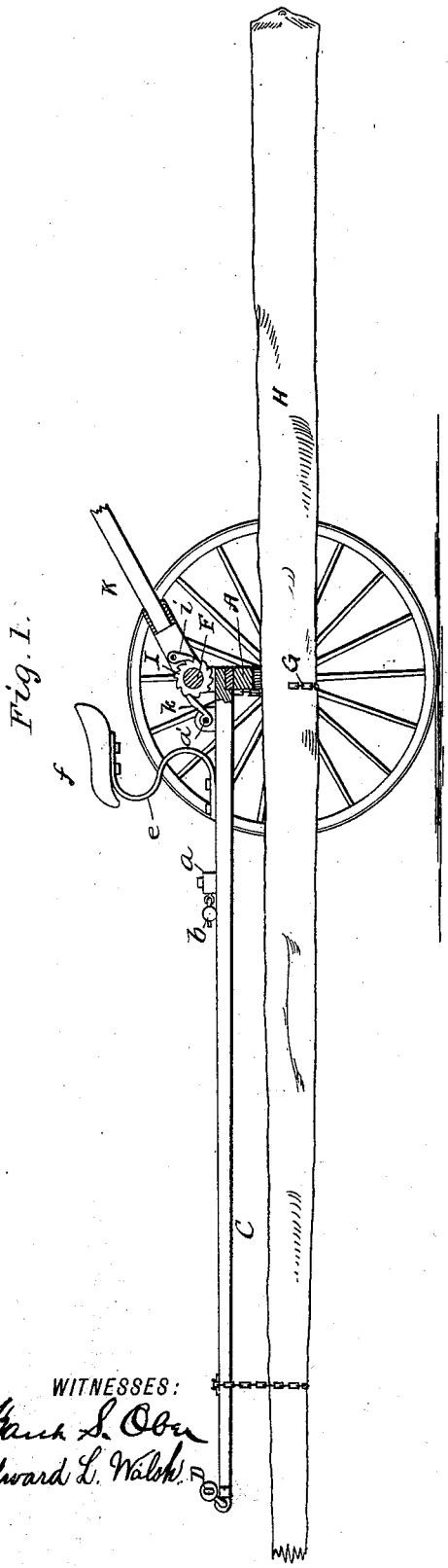
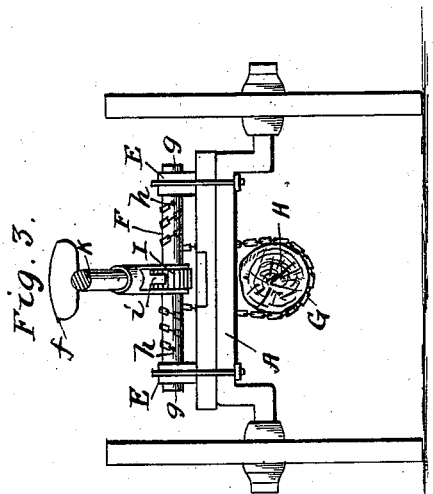
WITNESSES:
Frank S. Ober
Edward L. Walsh
INVENTORS
John Titus
William Titus
James H. Whitney
ATTORNEY.

(No Model.) 2 Sheets—Sheet 2.
J. & W. TITUS.
CART FOR TRANSPORTING TELEGRAPH POLES, &c.
No. 504,377. Patented Sept. 5, 1893.
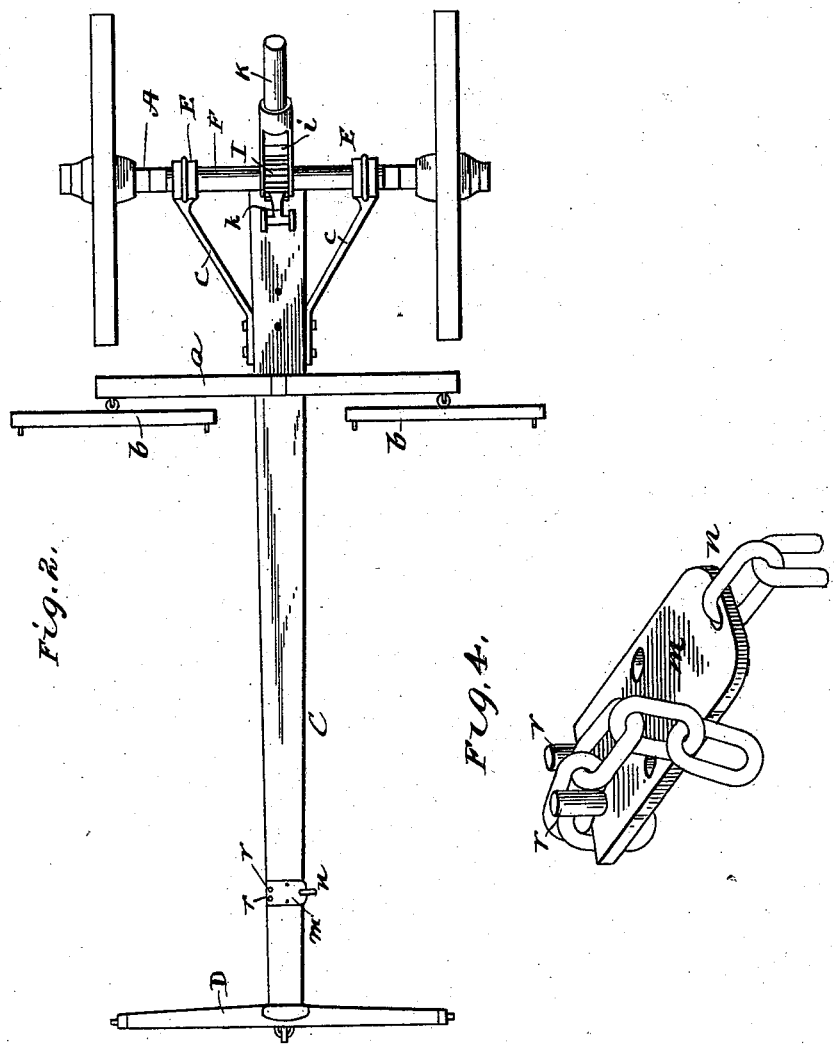
WITNESSES:
Frank S. Ober
Edward L. Walsh
INVENTORS
John Titus
William Titus
By James A. Whitney
ATTORNEY.

UNITED STATES PATENT OFFICE.

JOHN TITUS, OF OYSTER BAY, AND WILLIAM TITUS, OF NORTH HEMPSTEAD, NEW YORK.

CART FOR TRANSPORTING TELEGRAPH-POLES, &c.

SPECIFICATION forming part of Letters Patent No. 504,377, dated September 5, 1893.

Application filed June 24, 1891. Serial No. 397,356. (No model.)

*To all whom it may concern:*

Be it known that we, JOHN TITUS, of Oyster Bay, in the county of Queens and State of New York, and WILLIAM TITUS, of North Hempstead, in the said county and State, have invented certain new and useful Improvements in Carts for Transporting Telegraph-Poles, &c.; and we do hereby declare that the following is a full, clear, and exact description of the same, reference being had to the accompanying drawings, in which—

Figure 1 is a side view, Fig. 2 a plan view, and Fig. 3 a rear view of a cart made according to our invention. Fig. 4 is a detailed view on a larger scale further illustrating certain parts embraced in Figs. 1 and 2.

The transportation of telegraph poles, owing to their great length and unwieldy character, is extremely difficult, and consequently expensive with carts or vehicles of any ordinary construction, and furthermore with such use of ordinary carts or vehicles accidents of a serious character are liable to occur.

The object of our invention is to provide a wheeled apparatus by which telegraph poles and other timbers of great lengths may be easily loaded upon the vehicle, and readily transported from place to place without danger of displacement from the positions requisite for safety and convenience during such transportation.

A is an axle provided with wheels B B and from which extends the tongue or draft pole C, to which latter are attached two whiffle-trees, $a$, and $b$, $b$, in the usual or in any suitable manner. The front end of said tongue C is designed to act in conjunction with the ordinary neck-yoke D of double harness. The tongue C is connected to the axle A in any suitable manner, and if preferable strengthened by braces, $c$, $c$. The tongue may also carry, by means of a spring support, $e$, a suitable seat $f$, for the driver. Upon the axle A are provided pillow blocks E, firmly secured to said axle and which provide bearings for the journals, $g$, of a windlass roller F, which is placed substantially parallel with the axle to opposite parts as at $h$. To this windlass roller F are attached the opposite ends of a chain G, which thus depends in the form of a loop, below the said axle. By rotating windlass F the end portions of the chain G are wound thereon, thereby shortening the loop, correspondingly raising the telegraph pole or timber H which previous to such shortening of the loop is thrust through the same. To provide for turning the windlass roller F, there is made fast thereto a ratchet wheel I, into which plays the pawl, $i$, of a ratchet lever K. Acting in conjunction with the pawl, $i$, is a stop pawl, $k$, which may be pivoted as shown at $a'$, to the rear end of the tongue C. By working the ratchet lever K the windlass roller F may be turned to any requisite extent to shorten the loop chain G. When the telegraph pole or timber is placed in the loop as hereinbefore explained, it is thrust forward until it is substantially balanced upon said loop and purchased underneath the tongue C and ordinarily more or less beyond the forward end thereof. The tongue C is provided with a suitable device which should be as near as may be to the forward end of said tongue which prevents any lateral movement of the telegraph pole or timber with reference to said tongue. This device may be of any suitable kind as for example, a vertical pin fastened to the tongue and projecting downward into an auger hole of corresponding size over into the adjacent side of the telegraph pole. A much more convenient device for the purpose, however, is that which is represented in the drawings and which is constructed as follows:—Upon the top of the tongue C is placed a flat metallic plate, $m$, to one lateral edge or end of which is attached the end of a chain, $n$. Projecting upward from said plate are two studs, $r$, placed close together, but with a space between them sufficient to receive a link chain. When said link chain is placed edgewise between them, as represented in Fig. 4, the chain $n$, being carried around underneath the telegraph pole and brought upward upon the opposite side, tongue C has one of its links placed edgewise between the studs, $r$, with an adjacent link placed flatwise against the sides of said studs, as represented in said Fig. 4, thereby holding the chain securely with the telegraph pole passed through the same, below the tongue C, and held to the requisite degree against lateral movement in regard to said tongue. By the motions described the telegraph pole or long timber H, is easily elevated to its place clear of the ground and supported from the axle A, and is substantially held against lateral movement where it is, itself, connected to said axle. It is also firmly bound and attached at a point several feet in advance of the place where it is attached to said axle, and to all intents and purposes while thus secured in position and during transportation, its condition is substantially that which it would be if said telegraph pole or timber constituted a portion of the vehicle itself, and being securely retained against displacement in connection with the cart, it is readily and rapidly and conveniently moved from place to place and all liability of accident from the displacement of the telegraph pole or timber is consequently avoided.

What we claim as our invention is—

1. A vehicle for transporting telegraph poles and other long timbers, consisting of a single wheeled axle having a draft pole, a roller supported above and substantially parallel with the axle, a ratchet secured to the middle of the roller, a chain secured by each end to the roller each side of the ratchet, an operating lever having a pawl engaging the ratchet, and a stop pawl for the ratchet, substantially as described.

2. The combination fastening device composed of the plate, $m$, chain, $n$, and the stud, $r$, with the tongue C, wheel axle A, windlass roller F, and loop chain G, all substantially as and for the purpose herein set forth.

JOHN TITUS.
WILLIAM TITUS.

Witnesses:
GEO. HARRISON MCADAM,
EDWARD L. WALSH.